(12) United States Patent
Ohno et al.

(10) Patent No.: US 11,611,402 B2
(45) Date of Patent: Mar. 21, 2023

(54) COMMUNICATION DEVICE, COMMUNICATION RELAY SYSTEM, AND MASTER STATION APPARATUS

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Kenichi Ohno, Kawasaki (JP); Toshihiro Tango, Fuchu (JP); Takahiro Yamaura, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kanagawa (JP)

(*) Notice: Subject to any disclaimer, the term of this patent is extended or adjusted under 35 U.S.C. 154(b) by 101 days.

(21) Appl. No.: 16/936,574

(22) Filed: Jul. 23, 2020

(65) Prior Publication Data

US 2021/0044365 A1    Feb. 11, 2021

(30) Foreign Application Priority Data

Aug. 5, 2019   (JP) .............................. JP2019-143696

(51) Int. Cl.
*H04B 17/10* (2015.01)
*H04B 17/364* (2015.01)
(Continued)

(52) U.S. Cl.
CPC ......... *H04B 17/364* (2015.01); *H04B 7/0486* (2013.01); *H04B 17/104* (2015.01);
(Continued)

(58) Field of Classification Search
CPC ..................................................... H04W 28/02
See application file for complete search history.

(56) References Cited

U.S. PATENT DOCUMENTS

2006/0246900 A1   11/2006  Zheng
2010/0182981 A1    7/2010  Thoukydides et al.
(Continued)

FOREIGN PATENT DOCUMENTS

JP   2007-501578 A   1/2007
JP   2010-534049 A   10/2010
(Continued)

OTHER PUBLICATIONS

"CPRI Specification V7.0 (Oct. 9, 2015)", 2015 Ericsson AB, Huawei Technologies Co. Ltd, NEC Corporation, Alcatel Lucent, and Nokia Networks, 128 pages.
(Continued)

*Primary Examiner* — Sulaiman Nooristany
(74) *Attorney, Agent, or Firm* — Maier & Maier, PLLC

(57) ABSTRACT

A communication device according to an embodiment is capable of communicating with another communication device via a first network and a second network each transmitting radio signal data by different communication methods. The communication device includes: a first communicator capable of communicating with another communication device via the first network; a second communicator capable of communicating with another communication device via the second network; a delay parameter acquirer to acquire a delay parameter of the first network; and a delay parameter reflector to reflect the delay parameter of the first network acquired by the delay parameter acquirer on a delay parameter of the second network.

8 Claims, 17 Drawing Sheets

(51) Int. Cl.
   *H04W 40/12* (2009.01)
   *H04W 24/08* (2009.01)
   *H04W 88/06* (2009.01)
   *H04L 45/121* (2022.01)
   *H04B 7/0456* (2017.01)

(52) U.S. Cl.
   CPC ........... *H04L 45/121* (2013.01); *H04W 24/08* (2013.01); *H04W 40/12* (2013.01); *H04W 88/06* (2013.01)

(56) References Cited

U.S. PATENT DOCUMENTS

| | | |
|---|---|---|
| 2013/0028249 A1 | 1/2013 | Thoukydides et al. |
| 2017/0195205 A1 | 7/2017 | Li et al. |
| 2018/0049147 A1 | 2/2018 | Chen et al. |
| 2020/0113016 A1* | 4/2020 | Sevindik ............ H04W 88/085 |

FOREIGN PATENT DOCUMENTS

| | | |
|---|---|---|
| JP | 2016-163232 A | 9/2016 |
| JP | 2017-121057 A | 7/2017 |
| JP | 2018-088580 A | 6/2018 |
| JP | 2018-520534 A | 7/2018 |

OTHER PUBLICATIONS

"ECPRI Specification V1.2 (Jun. 25, 2018)", 2018 Ericsson AB, Huawei Technologies Co., Ltd, NEC Corporation , and Nokia, 62 pages.

"IEEE 1 91 4.3-201 8—IEEE Standard for Radio over Ethernet Encapsulations and Mappings", IEEE, Oct. 5, 2018, 77 pages.

"802.1CM-2018—Time-Sensitive Networking for Fronthaul", IEEE, Jun. 8, 2018, 62 pages.

"IEEE 802.1Qcc-208—IEEE Standard for Local and Metropolitan Area Networks—Bridges and Bridge Networks—Amendment 31: Stream Reservation Protocol (SRP) Enhancements and Performance Improvements", IEEE, Oct. 31, 2018, 208 pages.

* cited by examiner

FIG.19

MAP INFORMATION

| MAP INFORMATION ID | | 0 | 1 | 2 | 3 | 4 | 5 |
|---|---|---|---|---|---|---|---|
| TYPE (MAPPING/DEMAPPING) | | MAPPING | DEMAPPING | MAPPING | DEMAPPING | MAPPING | DEMAPPING |
| PROTOCOL PARAMETER | APPLICATION PROTOCOL | IEEE1904.3 | IEEE1904.3 | eCPRI | eCPRI | eCPRI | eCPRI |
| | SPLIT OF APPLICATION PROTOCOL | Split E | Split E | Split E | Split E | Split E | Split E |
| | TRANSPORT PROTOCOL | - | - | UDP | UDP | UDP | UDP |
| | NETWORK PROTOCOL | - | - | IPv6 | IPv6 | IPv4 | IPv4 |
| | DATA LINK PROTOCOL | Ethernet | Ethernet | Ethernet | Ethernet | Ethernet | Ethernet |
| DESTINATION LINK | | ETHERNET LINK 1 | CPRI LINK 0 | ETHERNET LINK 0 | CPRI LINK 1 | ETHERNET LINK 2 | CPRI LINK 1 |
| SOURCE LINK | | CPRI LINK 0 | ETHERNET LINK 1 | CPRI LINK 1 | ETHERNET LINK 0 | CPRI LINK 1 | ETHERNET LINK 2 |
| FLOW ID (PC_ID) | | 1000 | 1000 | 1001 | 1001 | 1002 | 1002 |
| STREAM PARAMETER | PERIOD | $10\,\mu s$ | $10\,\mu s$ | $10\,\mu s$ | $10\,\mu s$ | $10\,\mu s$ | $10\,\mu s$ |
| | LARGEST FRAME SIZE | 1500 | 1500 | 1452 | 1452 | 1472 | 1472 |
| | LARGEST NUMBER OF FRAMES IN PERIOD | 8 | 8 | 8 | 8 | 8 | 8 |
| | MAXIMUM ALLOWABLE DELAY TIME | $100\,\mu s$ | $100\,\mu s$ | $100\,\mu s$ | $100\,\mu s$ | $100\,\mu s$ | $100\,\mu s$ |
| | PCP | 7 | 7 | 7 | 7 | 6 | 6 |

ETHERNET LINK INFORMATION

| ETHERNET LINK ID | 0 | 1 | 2 |
|---|---|---|---|
| ETHERNET PORT NUMBER | 0 | 0 | 1 |
| MATE DEVICE MAC ADDRESS | CC-CC-CC-CC-CC-CC | DD-DD-DD-DD-DD-DD | EE-EE-EE-EE-EE-EE |
| LOCAL DEVICE MAC ADDRESS | AA-AA-AA-AA-AA-AA | AA-AA-AA-AA-AA-AA | BB-BB-BB-BB-BB-BB |
| MATE DEVICE IP ADDRESS | fd00:0001::cccc | - | 172.168.1.2 |
| LOCAL DEVICE IP ADDRESS | fd00:0001::aaaa | - | 172.168.1.1 |
| MATE DEVICE UDP PORT | 6001 | | 6002 |
| LOCAL DEVICE UDP PORT | 6000 | | 6000 |

CPRI LINK INFORMATION

| CPRI LINK ID | 0 | 1 | 2 |
|---|---|---|---|
| CPRI PORT NUMBER | 0 | 1 | 2 |

RF LINK INFORMATION

| RF LINK ID | 0 | 1 | 2 |
|---|---|---|---|
| RF PORT NUMBER | 0 | 1 | 2 |

COMMUNICATION DEVICE, COMMUNICATION RELAY SYSTEM, AND MASTER STATION APPARATUS

CROSS-REFERENCE TO RELATED APPLICATIONS

This application is based upon and claims the benefit of priority from Japanese Patent Application No. 2019-143696, filed on Aug. 5, 2019, the entire contents of which are incorporated herein by reference.

FIELD

Embodiments described herein relate generally to a communication device, a communication relay system, and a master station apparatus.

BACKGROUND

Conventionally known are communication relay systems (optical repeater systems) that make mobile communication terminal devices, such as mobile phones and smartphones, available outside. Such communication relay systems cover a wide range of interior areas, such as large-scale commercial facilities and office buildings, by connecting a plurality of slave stations to a single master station connected to a radio base station and effectively extending the communication area of the radio base station.

In the communication relay systems, a network, which connects radio equipment (RE) and a radio equipment controller (REC), is called fronthaul. In the conventional fronthaul, radio signal data (IQ signals) is transmitted between the RE and the REC by a communication method (circuit switching method) using, for example, common public radio interface (CPRI).

For reducing the cost of the fronthaul, there has been recently developed a technology of transmitting the radio signal data by a packet switching method using Ethernet (registered trademark). The existing devices, which transmit the radio signal data by CPRI, are expected to be replaced with the devices that transmit the radio signal data by Ethernet. However, until the replacement is completed, it is considered that the radio signal data is transmitted by using both the communication methods of CPRI and Ethernet.

In the fronthaul, it is necessary to satisfy required conditions on delay to transmit the radio signal data. There has been developed a method of setting priorities to reduce delay when, for example, transmitting the radio signal data using an Ethernet switch. That method, however, is difficult to transmit the radio signal data while satisfying the required conditions on delay in a case where different communication methods, such as CPRI and Ethernet, are applied to the transmission path.

BRIEF DESCRIPTION OF THE DRAWINGS

FIG. 19 is a diagram of map information and others in the embodiment.

DETAILED DESCRIPTION

A communication device according to an embodiment is capable of communicating with another communication device via a first network and a second network each transmitting radio signal data by different communication methods. The communication device includes: a first communicator capable of communicating with another communication device via the first network; a second communicator capable of communicating with another communication device via the second network; a delay parameter acquirer to acquire a delay parameter of the first network; and a delay parameter reflector to reflect the delay parameter of the first network acquired by the delay parameter acquirer on a delay parameter of the second network.

Figure 1:
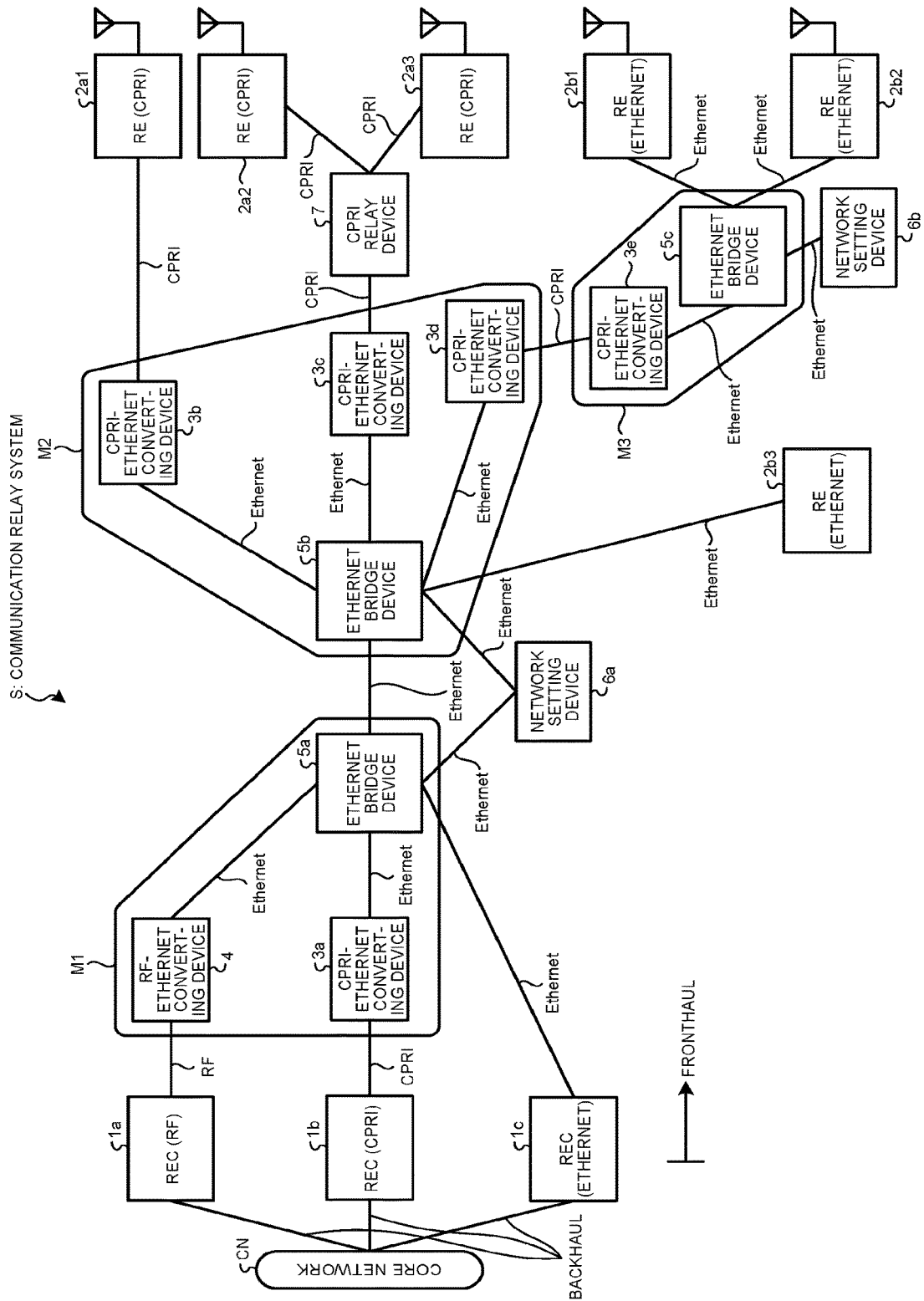
FIG. 1 is a block diagram of the entire configuration of a communication relay system according to an embodiment of the present disclosure.

Exemplary embodiments according to the present invention will be described below with reference to the accompanying drawings. In the following description, a delay time may be simply referred to as "delay". FIG. 1 is a block diagram of the entire configuration of a communication relay system S according to an embodiment of the present invention. The communication relay system S is installed in large-scale commercial facilities or office buildings, which are kinds of a so-called dead zone, for example. The communication relay system S includes devices illustrated in FIG. 1.

A radio equipment controller (or REC) (RF) 1a is connected to an RF-Ethernet converting device 4 by a coaxial cable or the like and includes an interface that inputs and outputs radio frequency (RF) signals. The REC (RF) 1a is able to communicate, over a backhaul, with a core network CN used for the communication. The REC (RF) 1a is a base station that is compliant with 4G (fourth-generation mobile communication method), for example.

An REC (CPRI) 1b is connected to a CPRI-Ethernet converting device 3a by an optical fiber or the like and performs communications using common public radio interface (CPRI). The network using CPRI (CPRI network) is an example of a first network. The REC (CPRI) 1b is able to communicate with the core network CN over the backhaul. The REC (CPRI) 1b is a base station that is compliant with 4G, for example. An REC (Ethernet) 1c is connected to an Ethernet bridge device 5a and other devices by an optical fiber or the like, and performs communications by Ethernet provided by the IEEE 802.3 standard. eCPRI or the like is used for the upper layer protocol of the communications. The network using eCPRI is an example of a second network. The REC (Ethernet) 1c is able to communicate with the core network CN over the backhaul. The REC (Ethernet) 1c is a base station that is compliant with 5G (fifth-generation mobile communication method), for example.

The REC (RF) 1a, the REC (CPRI) 1b, and the REC (Ethernet) 1c may be referred to as an REC 1 when they are not particularly distinguished from one another (the same manner is applied to the other devices). The REC 1 controls radio equipment (or RE) 2 (RE (CPRI) 2a and RE (Ethernet) 2b), which will be described later. The network between the REC 1 and the RE 2 is referred to as fronthaul.

The RE (CPRI) 2a (2a1, 2a2, and 2a3) is connected to a CPRI-Ethernet converting device 3b and a CPRI relay device 7 via an optical fiber or the like and performs communications by CPRI.

The RE (Ethernet) 2b (2b1, 2b2, and 2b3) is connected to an Ethernet bridge device 5c and an Ethernet bridge device 5b via an optical fiber or the like and performs communications by Ethernet.

The RE 2 converts data and RF signals that are received from the REC 1 and performs radio communications with user terminals (mobile communication terminal devices, such as mobile phones and smartphones), which are not illustrated, by using an antenna.

An Ethernet bridge device 5 is connected to the RF-Ethernet converting device 4, a CPRI-Ethernet converting device 3, a network setting device 6 (6a and 6b), the REC (Ethernet) 1c, and the RE (Ethernet) 2b3 by an optical fiber or the like. The Ethernet bridge device 5 executes bridge (or switch) processing of Ethernet. The bridge processing refers to transfer of Ethernet frames defined by IEEE 802.1 time-sensitive networking (TSN) standard or the like.

In order to build a real-time and highly reliable network in the fronthaul, the network setting device 6 transmits setting information to TSN transmission and reception controllers (for example, a TSN transmission and reception controller 320 (FIG. 2), a TSN transmission and reception controller 415 (FIG. 3), a TSN transmission and reception controller 224 (FIG. 6), a TSN transmission and reception controller 509 (FIG. 7), and a TSN transmission and reception controller 132 (FIG. 11)) of the respective devices. The network setting device 6 implements a function called centralized network configuration (CNC) according to TSN standards.

The CPRI relay device 7 relays radio signal data (IQ signals) transmitted by CPRI. The CPRI relay device 7 has a function of distributing and synthesizing the IQ signals. Specifically, the CPRI relay device 7 has, for example, a function of duplicating the IQ signals transmitted from the REC 1 and transmitting the duplicates to a plurality of pieces of RE 2. The CPRI relay device 7 also has a function of synthesizing the IQ signals received from the RE 2 and transmitting a synthesized signal to the REC 1.

The RF-Ethernet converting device 4, the CPRI-Ethernet converting device 3a, and the Ethernet bridge device 5a represented by the reference numeral M1 in FIG. 1 may be implemented as one master station apparatus. Similarly, the CPRI-Ethernet converting device 3b, a CPRI-Ethernet converting device 3c, a CPRI-Ethernet converting device 3d, and the Ethernet bridge device 5b represented by the reference numeral M2 may be implemented as one master station apparatus. Similarly, a CPRI-Ethernet converting device 3e and the Ethernet bridge device 5c represented by the reference numeral M3 may be implemented as one master station apparatus.

The following describes functional configurations of the respective devices with reference to FIGS. 2 to 11. In FIGS. 2 to 11, the lines connecting components and the arrows provided to the lines indicate main flows of information. Information may possibly flow between the parts not connected by the line or flow in a direction opposite to the arrow of the line. When a plurality of devices include the same functional component having the same name and different reference numerals, the functional component is described in the explanation of any one of the devices and is not described in the explanation of the other devices appropriately. For simplifying the description, some of the reference numerals of the names may possibly be omitted.

Figure 2:
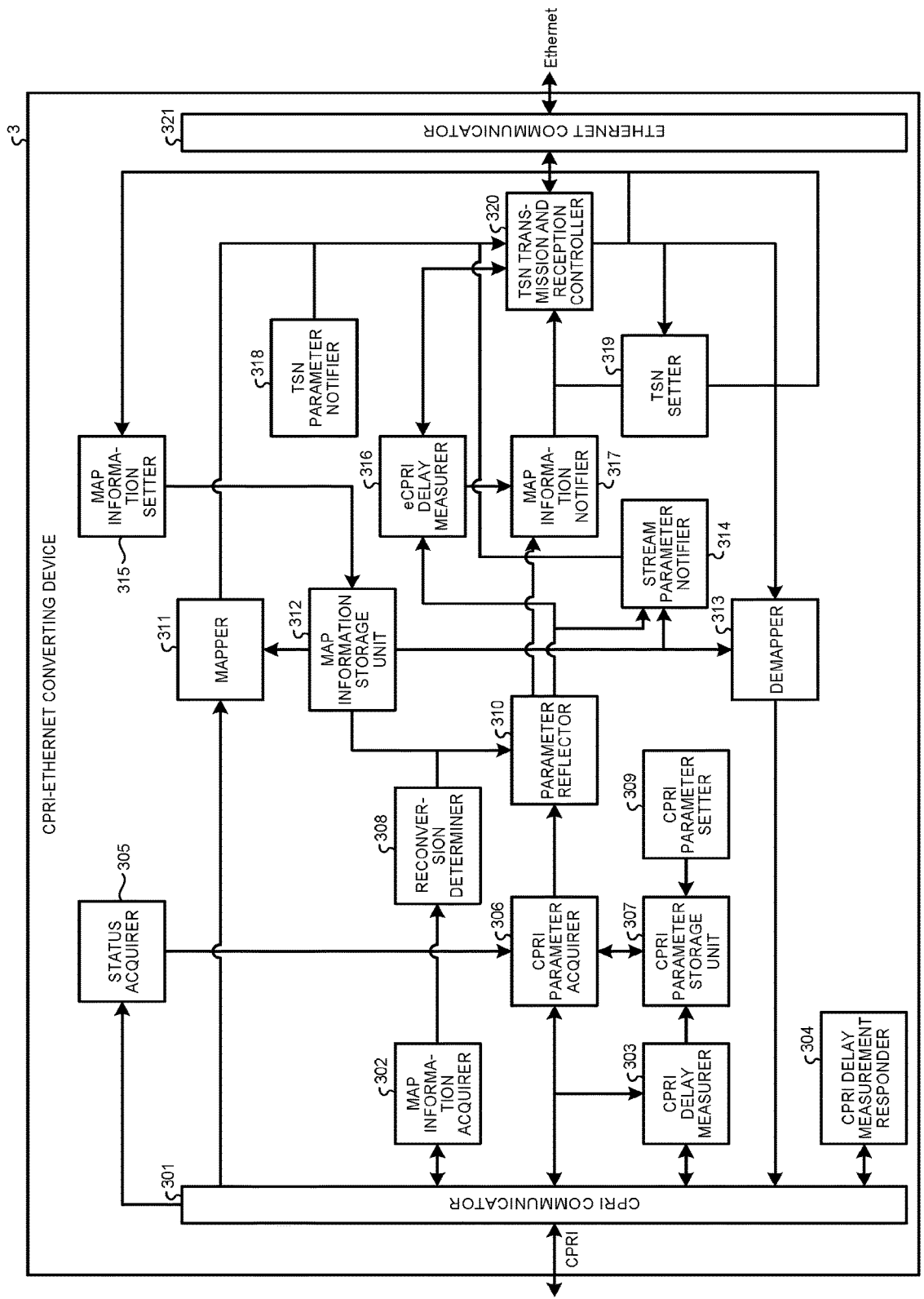
FIG. 2 is a block diagram of a functional configuration of a CPRI-Ethernet converting device in the embodiment.

FIG. 2 is a block diagram of a functional configuration of the CPRI-Ethernet converting device 3 in the embodiment. The CPRI-Ethernet converting device 3 is a communication device that is capable of communicating with other communication devices via the CPRI network (first network) and the network by Ethernet (second network), each transmitting radio signal data by different communication methods (from each other). The CPRI-Ethernet converting device 3 includes units 301 to 321.

CPRI Parameter Acquisition Processing

A CPRI communicator 301 (first communicator) is capable of transmitting and receiving data to and from other devices via a CPRI link in accordance with a protocol defined by CPRI. The data transmitted by CPRI includes, for example, user plane data including IQ signals, control and management plane data for controlling the RE 2, and data for time synchronization.

A status acquirer 305 monitors (acquires) the status of the CPRI network via the CPRI communicator 301 and determines whether the CPRI link of a target port is in an operational state. When the CPRI link is in an operational state, a CPRI parameter acquirer 306 (delay parameter acquirer) acquires a CPRI parameter. The CPRI parameter represents a delay obtained by a CPRI delay measurer 303, for example. The CPRI parameter acquirer 306 also acquires a signal synthesis delay (delay time required for signal synthesis) which arises in the CPRI relay device 7. These values are stored in a CPRI parameter storage unit 307. The CPRI parameter may be set in advance by a CPRI parameter setter 309 and stored in the CPRI parameter storage unit 307, instead of being acquired by the CPRI parameter acquirer 306.

Reconversion Determination Processing

After the CPRI parameter acquisition processing, reconversion determination processing is executed. In the present embodiment, the delay parameter of CPRI is reflected on a parameter of eCPRI or TSN. In this case, when the number of times of conversion between the CPRI network and an eCPRI network (network by Ethernet) is twice or more, reflection on the parameter of eCPRI or TSN is repeatedly performed, thereby failing to transmit accurate information.

Considering above, when, for example, the number of times of conversion is twice, the present embodiment gives notification of half of one-way delay as the parameter of eCPRI or TSN. For this reason, the CPRI-Ethernet converting device 3 includes a reconversion determiner 308. The reconversion determiner 308 determines whether the CPRI network perfoiiiis communications by the same communication method as the eCPRI network through the CPRI communicator 301. In other words, in the reconversion determination processing, the reconversion determiner 308 determines whether there is the eCPRI network in the CPRI network again and whether the communication method is converted into eCPRI.

For this reason, the CPRI-Ethernet converting device 3 includes a map information acquirer 302. In CPRI, a mechanism is prepared for transmitting and receiving frames of Ethernet. That is, the map information acquirer 302 acquires map information from a map information notifier (not illustrated) of a device connected by Ethernet via the network of CPRI. The map information defines which link of CPRI is mapped onto the flow of eCPRI. The reconversion determiner 308 determines whether reconversion is performed based on the map information.

Map Information and Others

The following describes the map information and others. FIG. 19 is a diagram of the map information and others in the embodiment. The map information relates to radio signal data and includes the types of the CPRI network and the eCPRI network for each link, through which the radio signal data passes, and the delay parameter. Specifically, the map information includes a map information ID for identifying the map information, a type indicating whether to perforin mapping or demapping, and a protocol parameter for mapping or demapping. The map information further includes a destination link for specifying a link for output, a source link for specifying a link for input, a flow ID for identifying an IQ signal, and a stream parameter.

The protocol parameter includes an application protocol, a split of the application protocol (data form), a transport protocol, a network protocol, and a data link protocol. The application protocol specifies the protocol of an application layer. The transport protocol specifies the protocol of a transport layer. The network protocol specifies the protocol of a network layer. The data link protocol specifies the protocol of a data link layer.

The stream parameter includes a period of transmission or reception of the flow, the largest frame size of Ethernet, the largest number of frames transmitted or received in the period, the maximum allowable delay time of the stream, and a priority code point (PCP). The PCP is set based on TSN setting information (which will be described later in greater detail) generated by the network setting device 6.

Ethernet link ID of Ethernet link information, CPRI link ID of CPRI link information, and RF link ID of RF link information are designated for the destination link and the source link.

The Ethernet link information includes an Ethernet link ID for identifying an Ethernet link, a port number of an Ethernet communicator, a media access control (MAC) address of a mate device, a MAC address of the local device, an IP address of the mate device, an IP address of the local device, a user datagram protocol (UDP) port number of the mate device, and a UDP port number of the local device.

The CPRI link information includes a CPRI link ID for identifying a CPRI link and a port number of a CPRI communicator.

The RF link information includes a RF link ID for identifying an RF link and a port number of an RF interface.

Mappers (for example, a mapper 311 (FIG. 2), a mapper 407 (FIG. 3), a mapper 231 (FIG. 6), and a mapper 123 (FIG. 11)) and demappers (for example, a demapper 313 (FIG. 2), a demapper 409 (FIG. 3), a demapper 233 (FIG. 6), and a demapper 125 (FIG. 11)) of the respective devices perform mapping and demapping, respectively, with reference to the map information. The map information may be set in advance from the MAC address or the information on the ports of the respective connected links in the devices, or may be set by the REC 1 via a network.

Parameter Reflection Processing

A parameter reflector 310 (delay parameter reflector) reflects, on the delay parameter of the eCPRI network, the delay parameter of the CPRI network acquired by the CPRI parameter acquirer 306. The parameter reflector 310 generates, for example, the delay parameter of the eCPRI network by at least one of adding and subtracting the delay parameter of the CPRI network to and from a predetermined delay parameter. Specifically, the predetermined delay parameter is the maximum allowable delay time of the stream of the radio signal data, for example. The parameter reflector 310 subtracts a one-way delay time in the CPRI network from the maximum allowable delay time, thereby generating the maximum allowable delay time of the eCPRI network.

Based on, for example, the reconversion determination result, the parameter reflector 310 reflects propagation delay included in the CPRI parameter on the stream parameter and measurement of delay of eCPRI. Specifically, when it is determined that reconversion has been performed, the parameter reflector 310 gives, as the maximum allowable delay time, notification of a value obtained by subtracting the value of half of one-way delay calculated from the CPRI parameter from the maximum allowable delay time of the stream parameter.

In measurement of delay of eCPRI, the parameter reflector 310 gives a time stamp by adding the value of half of one-way delay calculated from the CPRI parameter (delay parameter) to a received time stamp value. The parameter reflector 310 gives, as the time stamp value at the time when a response frame is transmitted, notification of a value obtained by subtracting the value of half of one-way delay calculated from the CPRI parameter from the original value.

When it is determined that reconversion has not been performed, the parameter reflector 310 gives as the maximum allowable delay time, notification of a value obtained by subtracting the value of one-way delay calculated from the CPRI parameter from the maximum allowable delay time of the stream parameter. In measurement of delay of eCPRI, the parameter reflector 310 gives a time stamp by adding the value of one-way delay calculated from the CPRT parameter to the received time stamp value. The parameter reflector 310 gives, as the time stamp value at the time when the response frame is transmitted, notification of a value obtained by subtracting the value of one-way delay calculated from the CPRI parameter from the original value.

A stream parameter notifier 314 (parameter notifier) notifies other devices of the delay parameter of the eCPRI network on which the delay parameter of the CPRI network is reflected by the parameter reflector 310.

An eCPRI delay measurer 316 (delay measurer) measures a delay of the eCPRI network. When a request for delay measurement is received from other devices, the eCPRI delay measurer 316 adds the delay parameter of the CPRI network to the time stamp value, thereby giving a response of delay measurement.

A TSN setter 319 perfoinis setting of TSN based on the TSN setting information received from the network setting device 6. A TSN transmission and reception controller 320 controls transmission and reception of TSN based on the TSN setting performed by the TSN setter 319.

Figure 3:
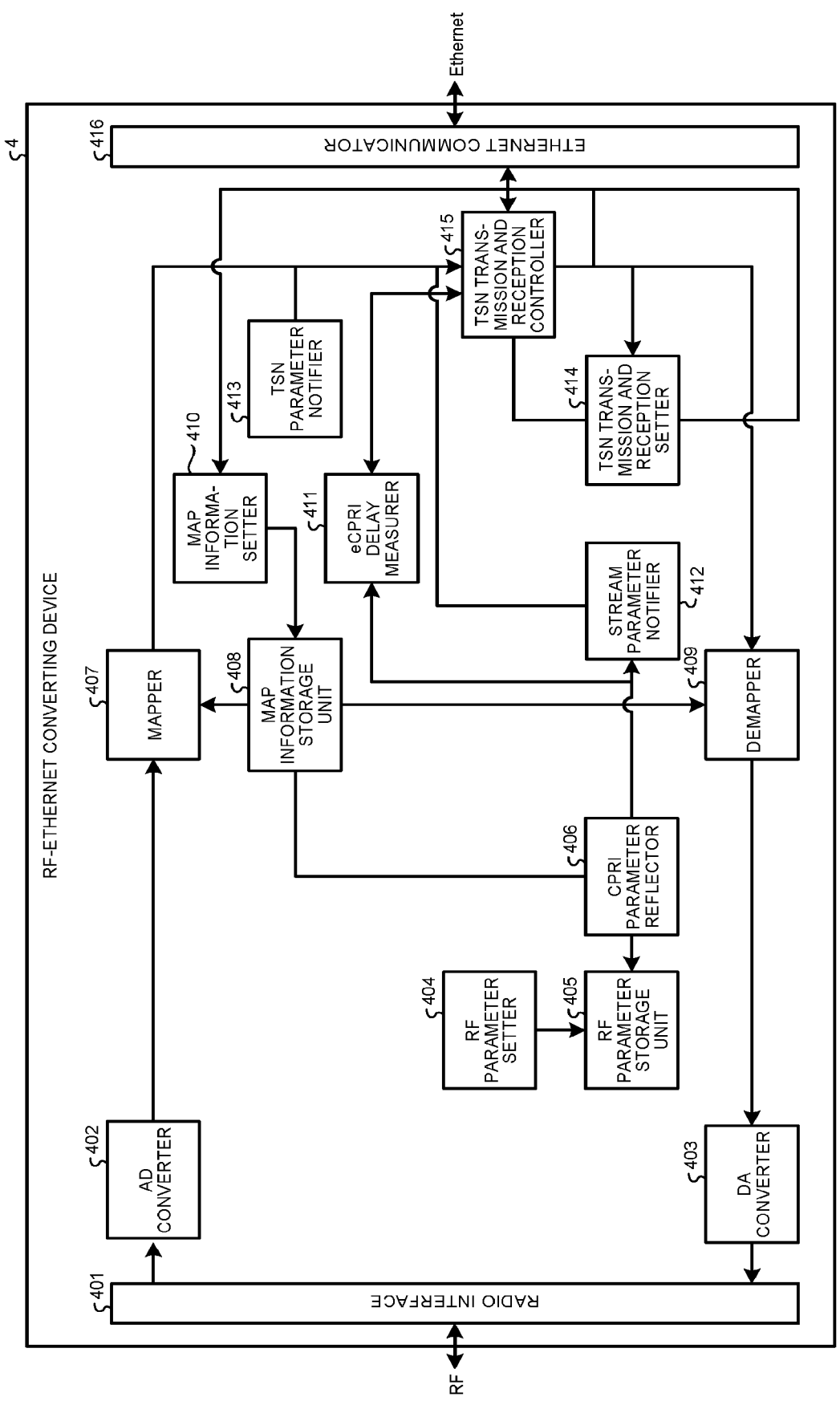
FIG. 3 is a block diagram of a functional configuration of an RF-Ethernet converting device in the embodiment.

FIG. 3 is a block diagram of a functional configuration of the RF-Ethernet converting device 4 in the embodiment. The RF-Ethernet converting device 4 includes units 401 to 416.

Downstream Signal Processing

Upon receiving RF signals from the REC (RF) 1*a*, a radio interface 401 executes radio reception processing, such as signal amplification, filtering, and down-conversion, thereby generating analog signals. Subsequently, an AD converter 402 converts the analog signals into digital IQ signals. Subsequently, the mapper 407 maps the obtained signals onto the format of eCPRI, for example, based on the map information. A TSN transmission and reception controller 415 performs PCP control on the mapped signals and transmits them. An Ethernet communicator 416 executes processing for transmission provided by Ethernet and transmits an Ethernet frame to the eCPRI network.

Upstream Signal Processing

The Ethernet communicator 416 executes processing for reception defined by Ethernet on the received Ethernet frame. Subsequently, the TSN transmission and reception controller 415 executes filtering and other processing as needed and transfers the frame to a demapper 409. The demapper 409 extracts required digital IQ signals (digital signals) based on the format of eCPRI, for example, and transmits them to a DA converter 403. The DA converter 403 converts the digital signals into analog signals and transmits them to the radio interface 401. The radio interface 401 executes radio transmission processing, such as up-conversion, filtering, and signal amplification, thereby generating RF signals. The radio interface 401 transmits the RF signals to the REC (RF) 1*a*.

Stream Parameter Notification Processing

An RF parameter setter 404 sets a parameter relating to RF in advance and stores the parameter in an RF parameter storage unit 405. The RF parameter includes, for example, a propagation time calculated from the length of a coaxial cable connected to the radio interface 401. A parameter reflector 406 reflects propagation delay and other elements included in the RF parameter on the stream parameter and measurement of delay of eCPRI. Specifically, the parameter reflector 406 defines a value obtained by subtracting the value of one-way delay calculated from the RF parameter from the maximum allowable delay time of the stream parameter as the maximum allowable delay time. In measurement of delay of eCPRI, the parameter reflector 406 gives a time stamp by adding the value of one-way delay calculated from the RF parameter to a received time stamp value. The parameter reflector 406 calculates, as the time stamp value at the time when a response frame is transmitted, a value by subtracting the value of one-way delay calculated from the RF parameter from the original value.

A stream parameter notifier 412 notifies other devices of the parameter calculated (resulting from reflection) by the parameter reflector 406.

Figure 4:
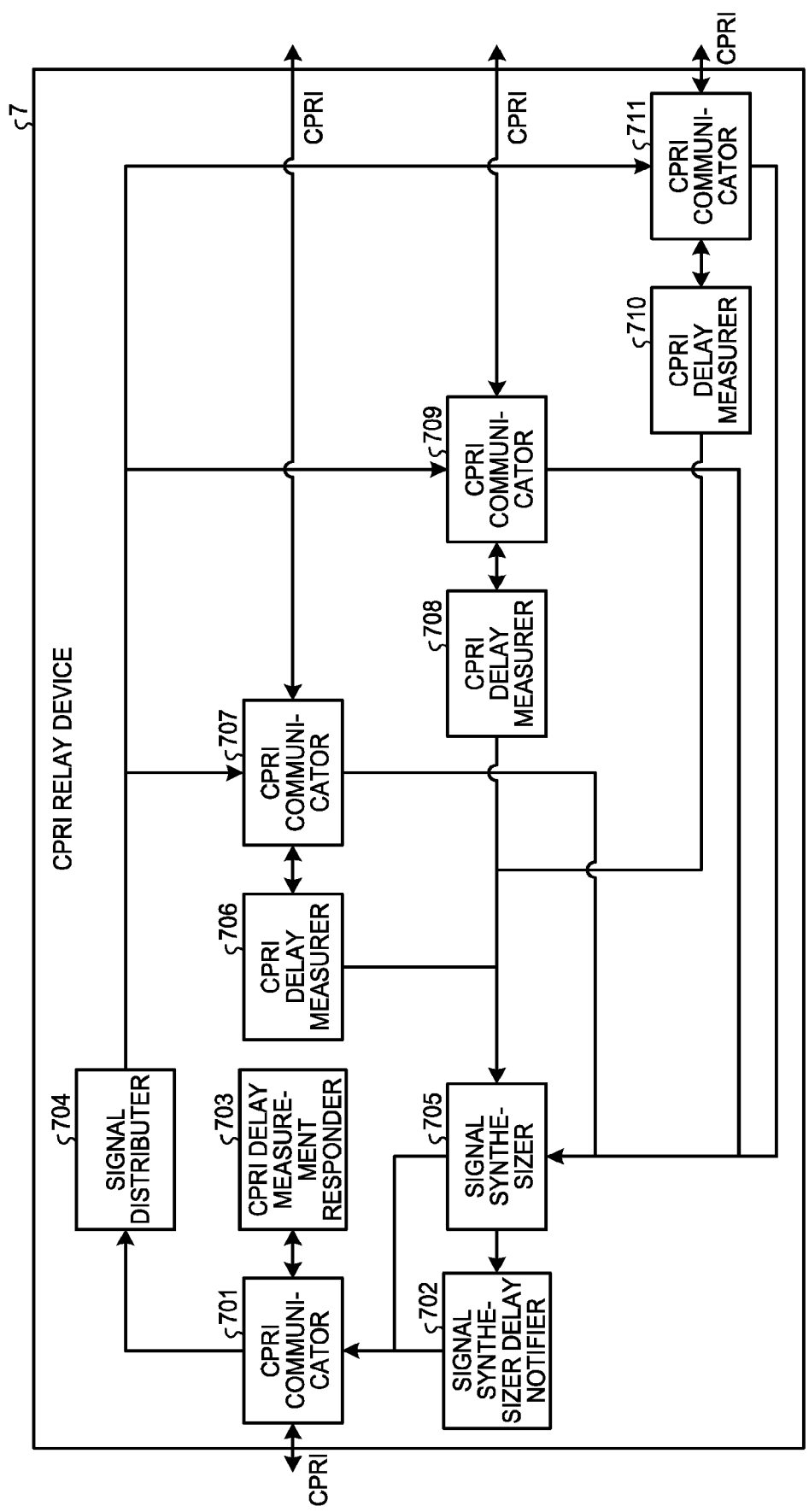
FIG. 4 is a block diagram of a functional configuration of a CPRI relay device in the embodiment.

FIG. 4 is a block diagram of a functional configuration of the CPRI relay device 7 in the embodiment. The CPRI relay device 7 includes units 701 to 711.

Downstream Signal Processing

Upon receiving optical signals transmitted from the REC 1 or other devices, a CPRI communicator 701 performs optical-electrical conversion and transmits the obtained signals to a signal distributor 704. The signal distributor 704 performs duplication to distribute the digitized IQ signals included in the user plane of CPRI to the respective pieces of RE 2. CPRI communicators 707, 709, and 711 receive the distributed IQ signals, perform electrical-optical conversion, and transmit optical signals.

Upstream Signal Processing

The CPRI communicators 707, 709, and 711 receive optical signals transmitted from the RE 2 or other devices, perform optical-electrical conversion, and transfer the obtained signals to a signal synthesizer 705. The signal synthesizer 705 extracts required IQ signals based on the format of CPRI and synthesizes them.

Delay Measurement Responding Processing

When performing delay measurement by the function of CPRI in the REC (CPRI) 1*b* or other devices connected to the upstream, a CPRI delay measurement responder 703 transmits data for delay measurement to the REC (CPRI) 1*b* or other devices via the CPRI communicator 701. As a result, it is possible to measure the delay from the REC 1 to the present device (CPRI relay device 7).

Delay Measurement Processing

CPRI delay measurers 706, 708, and 710 measure the delay to the RE (CPRI) 2*a* (2*a*2 and 2*a*3) connected to the downstream. This processing is performed in accordance with the regulations of CPRI. The CPRI delay measurers 706, 708, and 710 measure the propagation delay by transmitting synchronization information on CPRI and receiving responses from the delay measurement responders of CPRI of the intermediate devices.

Signal Synthesis Delay Notification Processing

The signal synthesizer 705 synthesizes the IQ signals of a plurality of CPRI links and transmits the resulting signal to the upstream. While the signal synthesis needs to be performed at the same timing, the CPRI signals enter the signal synthesizer 705 at different timings due to difference in the length of wiring, for example. For this reason, the signal synthesizer 705 performs buffering to match the timing. A signal synthesizer delay notifier 702 notifies other devices of the amount of delay caused by buffering. The notification may be transmitted actively or passively in response to a request from the CPRI parameter acquirers (for example, the CPRI parameter acquirer 306 (FIG. 2)) of other devices.

Figure 5:
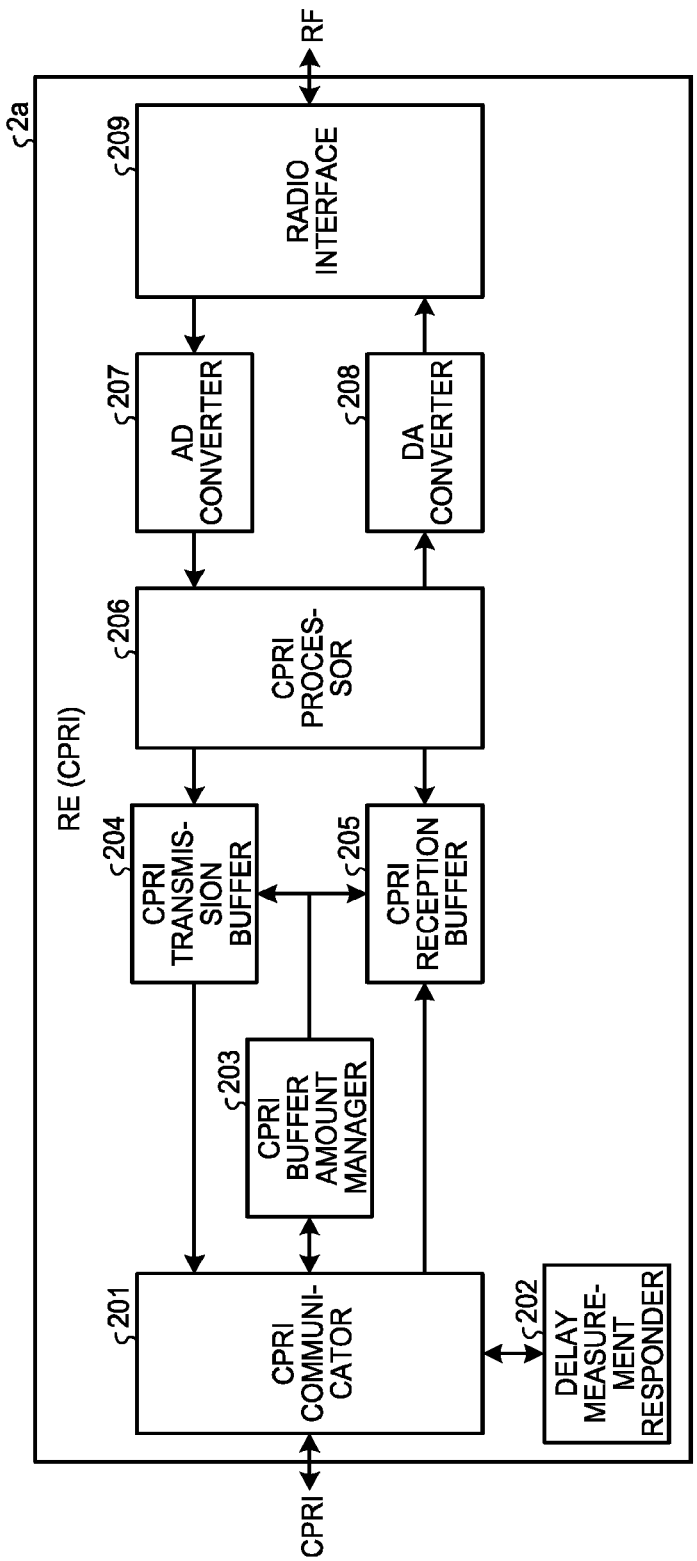
FIG. 5 is a block diagram of a functional configuration of RE (CPRI) in the embodiment.

FIG. 5 is a block diagram of a functional configuration of the RE (CPRI) 2*a* in the embodiment. The RE (CPRI) 2*a* includes units 201 to 209.

Downstream Signal Processing

A CPRI communicator 201 performs optical-electrical conversion on optical signals from the upstream and transmits the obtained signals to a CPRI reception buffer 205. A CPRI processor 206 extracts required IQ signals (digital signals) based on the format of CPRI and transmits them to a DA converter 208. The DA converter 208 converts the digital signals into analog signals and outputs them to a radio interface 209. The radio interface 209 executes radio transmission processing, such as up-conversion, filtering, and signal amplification, and transmits the RF signals via an antenna.

Upstream Signal Processing

Upon receiving RF signals from the antenna, the radio interface 209 executes radio reception processing, such as signal amplification, filtering, and down-conversion, thereby generating analog signals. The radio interface 209 transmits the analog signals to an AD converter 207. The AD converter 207 converts the analog signals into digital signals and transfers the digital signals to the CPRI processor 206. The CPRI processor 206 maps the digital signals onto, for example, the format of CPRI and transmits the obtained data to a CPRI transmission buffer 204. The CPRI communicator 201 performs electrical-optical conversion on the data received from the CPRI transmission buffer 204 and transmits the optical signals to the upstream.

Buffer Amount Setting

A buffer amount setting instruction from a CPRI buffer amount instructor 113 (FIG. 10) of the REC (CPRI) 1b is transferred to the RE (CPRI) 2a by using control and management plane data of CPRI, for example. A CPRI buffer amount manager 203 performs setting such that the CPRT transmission buffer 204 and the CPRI reception buffer 205 perform buffering by respective instructed amounts based on the buffer amount setting instruction.

Figure 6:
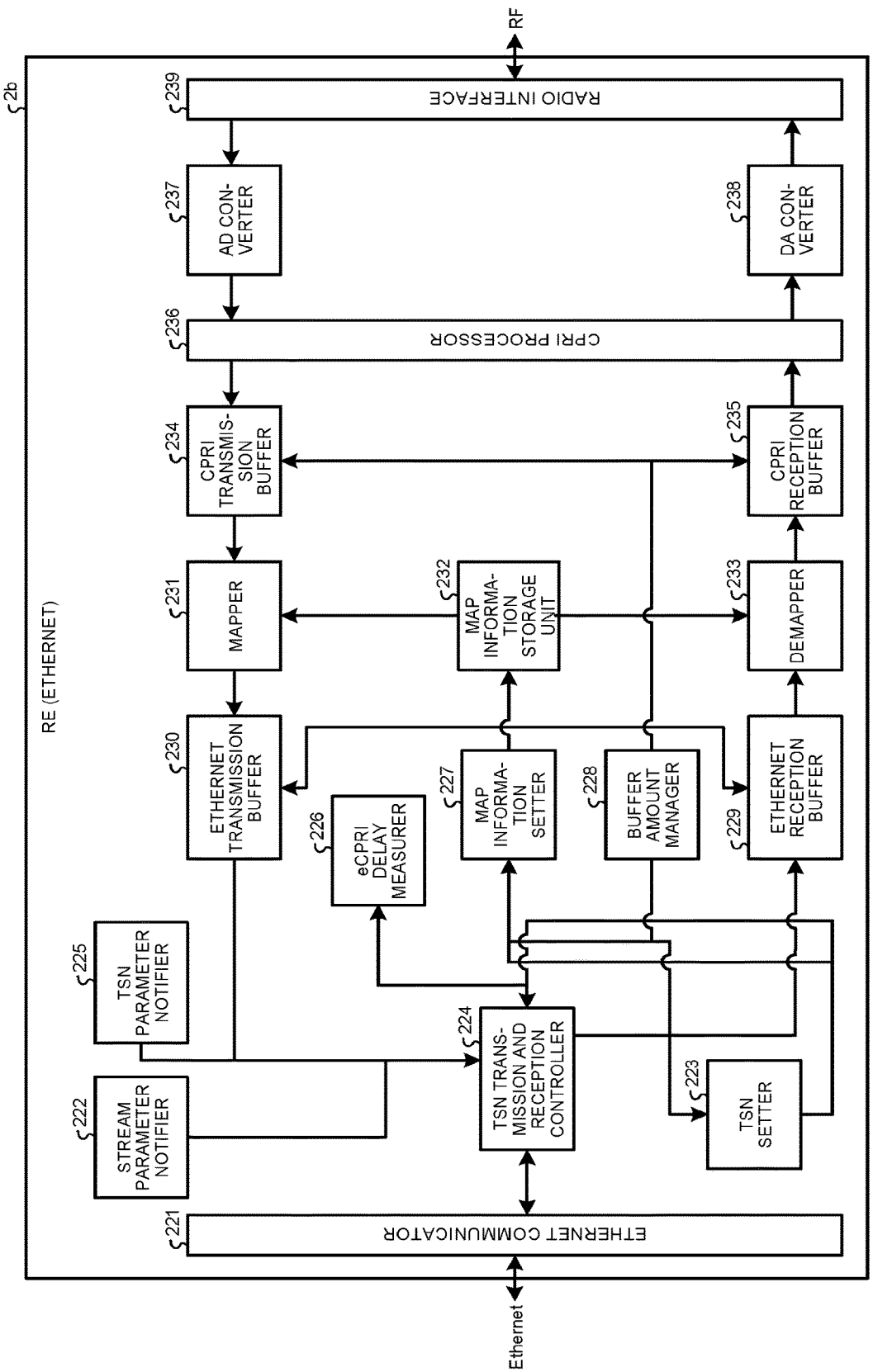
FIG. 6 is a block diagram of a functional configuration of RE (Ethernet) in the embodiment.

FIG. 6 is a block diagram of a functional configuration of the RE (Ethernet) 2b in the embodiment. The RE (Ethernet) 2b includes units 221 to 239.

Buffer Amount Setting

A buffer amount setting instruction from an Ethernet buffer amount instructor 126 (FIG. 11) of the REC (Ethernet) 1c is given as control and management plane data of eCPRI. A buffer amount manager 228 performs setting such that an Ethernet transmission buffer 230 and an Ethernet reception buffer 229 perform buffering by respective instructed amounts based on the buffer amount setting instruction. Moreover, the buffer amount manager 228 may perform setting such that a CPRI transmission buffer 234 and a CPRI reception buffer 235 perform buffering by respective instructed amounts.

Figure 7:
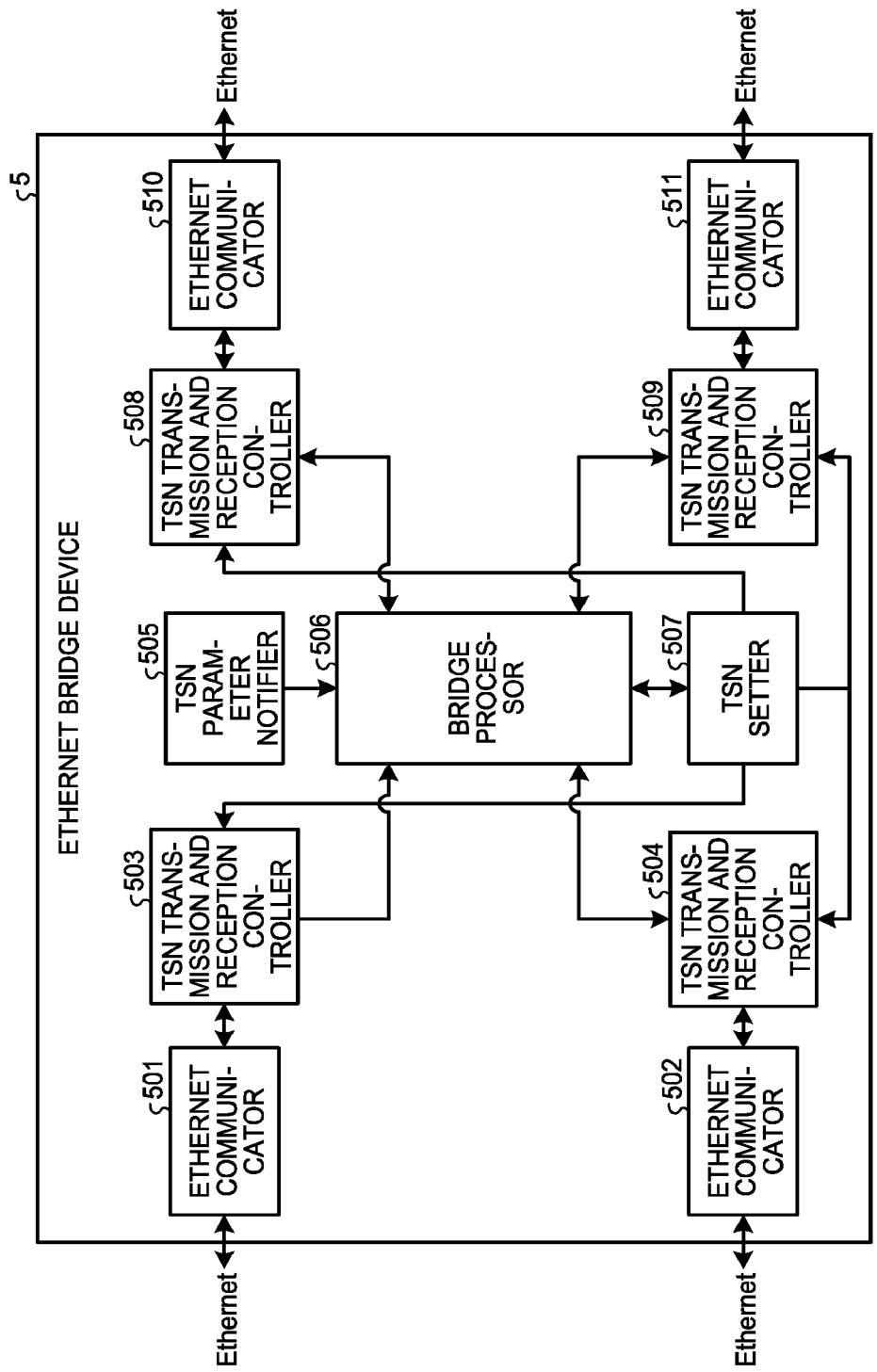
FIG. 7 is a block diagram of a functional configuration of an Ethernet bridge device in the embodiment.

FIG. 7 is a block diagram of a functional configuration of the Ethernet bridge device 5 in the embodiment. The Ethernet bridge device 5 includes units 501 to 511.

Bridge Processing

Ethernet communicators 501 and 502 receive Ethernet frames. TSN transmission and reception controllers 503 and 504 perform reception control on TSN set to the port as needed, and a bridge processor 506 executes bridge processing. The bridge processing is executed based on a database called a filtering database (FDB) that determines a destination of the frame. Specifically, a port from which a frame is to be output is identified by using the destination address of the frame and VLAN ID, and the frame is output from the identified port. TSN transmission and reception controllers 508 and 509 provided for each port perform TSN transmission control. In the present embodiment, PCP control is performed based on, for example, the PCP of the frame. The frames are transmitted via Ethernet communicators 510 and 511, and the transfer is completed.

TSN Setting Processing

A TSN parameter notifier 505 notifies a TSN parameter acquirer 604 (FIG. 8) of the network setting device 6 of the TSN parameter via the bridge processor 506, the TSN transmission and reception controllers 508 and 509, and the Ethernet communicators 510 and 511. This operation may be performed passively or actively in response to a request from the TSN parameter acquirer 604. When acquisition of the required parameter is completed, a TSN setting information transmitter 603 of the network setting device 6 transmits the TSN setting information. A TSN setter 507 receives the TSN setting information via the Ethernet communicators 510 and 511, the TSN transmission and reception controllers 508 and 509, and the bridge processor 506. The TSN setter 507 performs setting on the TSN transmission and reception controllers 508 and 509 and the bridge processor 506 of each port based on the TSN setting information.

Figure 8:
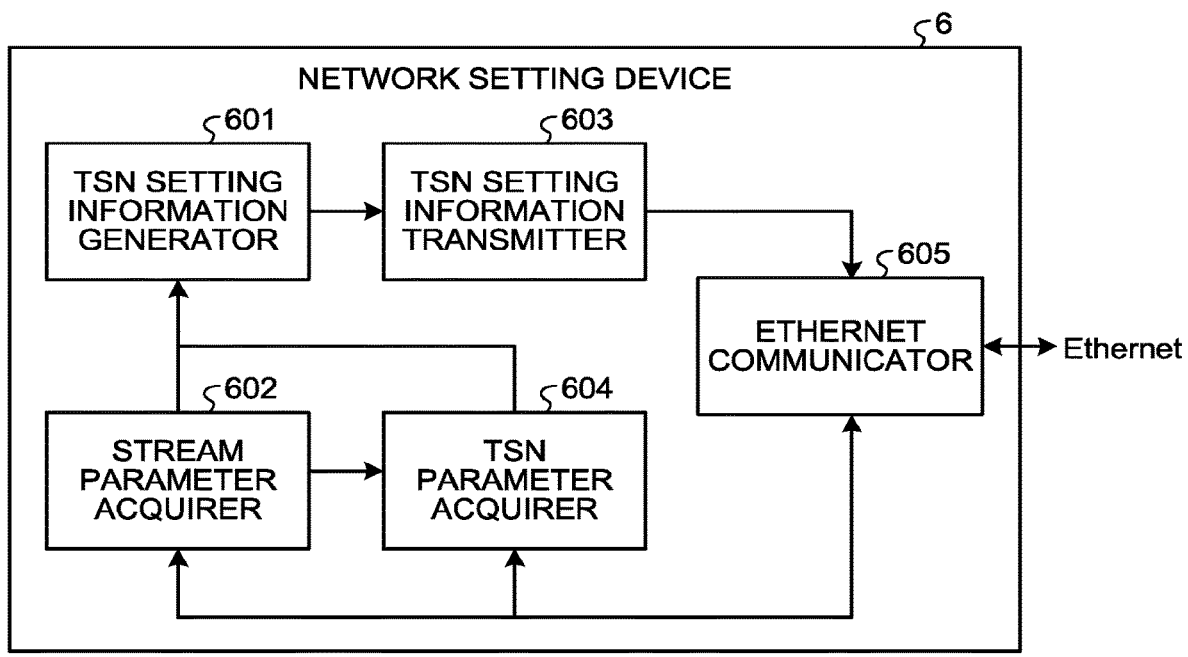
FIG. 8 is a block diagram of a functional configuration of a network setting device in the embodiment.

FIG. 8 is a block diagram of a functional configuration of the network setting device 6 in the embodiment. The network setting device 6 includes units 601 to 605.

TSN Setting Processing

A stream parameter acquirer 602 acquires a stream parameter through an Ethernet communicator 605. The stream parameter includes, for example, an identifier of the stream, a transmission period of a frame, the largest frame size, the number of frames transmitted in the period, and the maximum allowable delay time.

A TSN parameter acquirer 604 acquires a TSN parameter through the Ethernet communicator 605. The TSN parameter includes, for example, a traffic class table representing the correspondence between the PCP of a frame and the PCP of a transmission queue, an FDB that specifies the destination of the frame, a delay (maximum and minimum values) when the frame is subjected to the bridge processing, and a propagation delay to a counter port of each port.

A TSN setting information generator 601 generates the TSN setting information based on the stream parameter and the TSN parameter. The TSN setting information transmitter 603 transmits the TSN setting information to the CPRI-Ethernet converting device 3, the RE (Ethernet) 2b, and the TSN setters (TSN setters 319, 223, and 507) of the Ethernet bridge device 5 through the Ethernet communicator 605. These devices perform setting on the TSN transmission and reception controllers (TSN transmission and reception controllers 320, 224, and 508 and 509) for each Ethernet port.

The TSN setting information generator 601 generates the TSN setting information such that each stream satisfies the maximum allowable delay time based on the information collected from the stream parameter notifiers and the TSN parameter notifiers of the respective devices.

The generated TSN setting information includes the PCP of a frame of a stream, a set traffic class table, PCP control information, and the FDB, for example. Those pieces of information are received by the TSN setters in the CPRI-Ethernet converting device 3, the RE (Ethernet) 2b, and the Ethernet bridge device 5. Those devices allocate the PCP of the frame of the stream given by the map information setter, to the PCP of the data link protocol. The frame is generated based on the PCP.

The traffic class table and the PCP control information are set in the TSN transmission and reception controller. The PCP control information includes information relating to gate control defined by IEEE 802.1Qbv and a setting of "express" and "preemptable" of each traffic class defined by IEEE 802.1Qbu. The FDB is set in the bridge processor from the TSN setter and associated with a port, a ULAN ID, and a MAC address.

Figure 9:
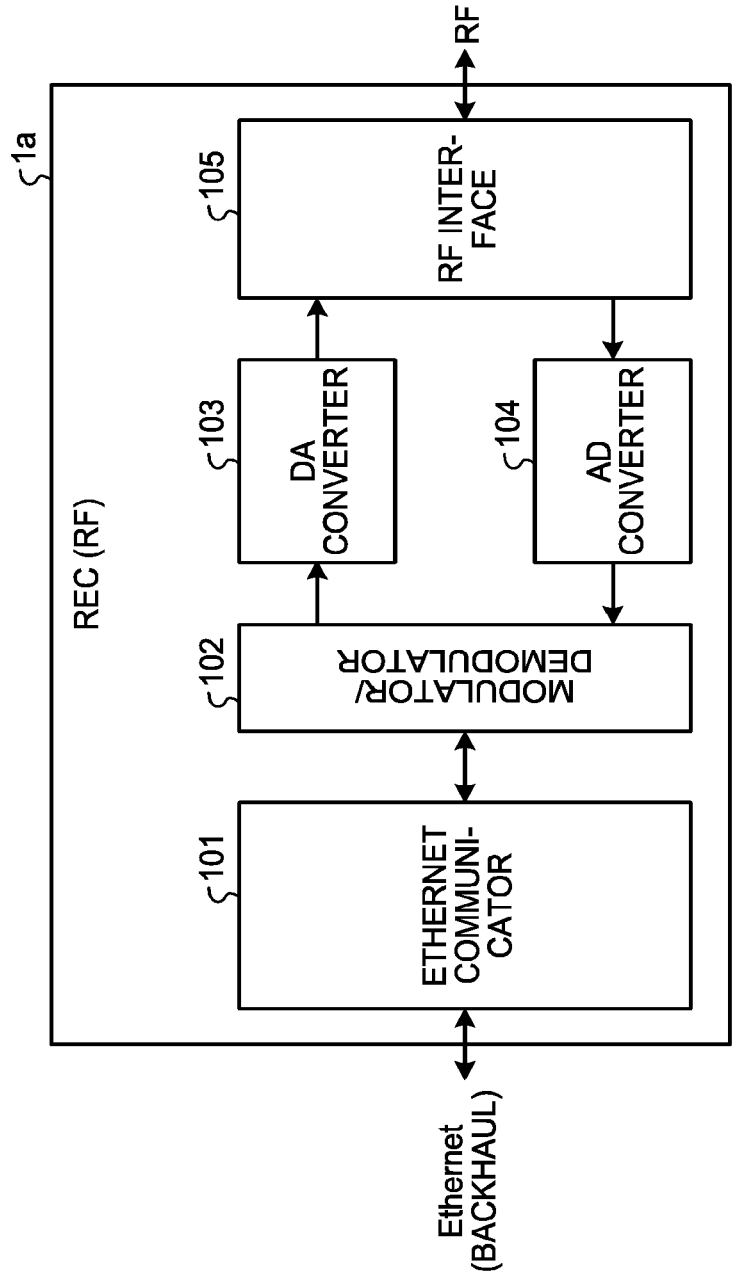
FIG. 9 is a block diagram of a functional configuration of an REC (RF) in the embodiment.

FIG. 9 is a block diagram of a functional configuration of the REC (RF) 1a in the embodiment. The REC (RF) 1a includes units 101 to 105.

Downstream Signal Processing

An Ethernet communicator 101 receives IP packets from the backhaul. A modulator/demodulator 102 converts the IP packets into radio data to be transmitted by the RE 2. A DA converter 103 converts digital signals into analog signals. An RF interface 105 transmits RF signals.

Upstream Signal Processing

The RF interface 105 receives RF signals. The AD converter 104 converts analog signals into digital signals. The modulator/demodulator 102 converts the digital signals into IP packets. The Ethernet communicator 101 transmits the IP packets to the backhaul.

Figure 10:
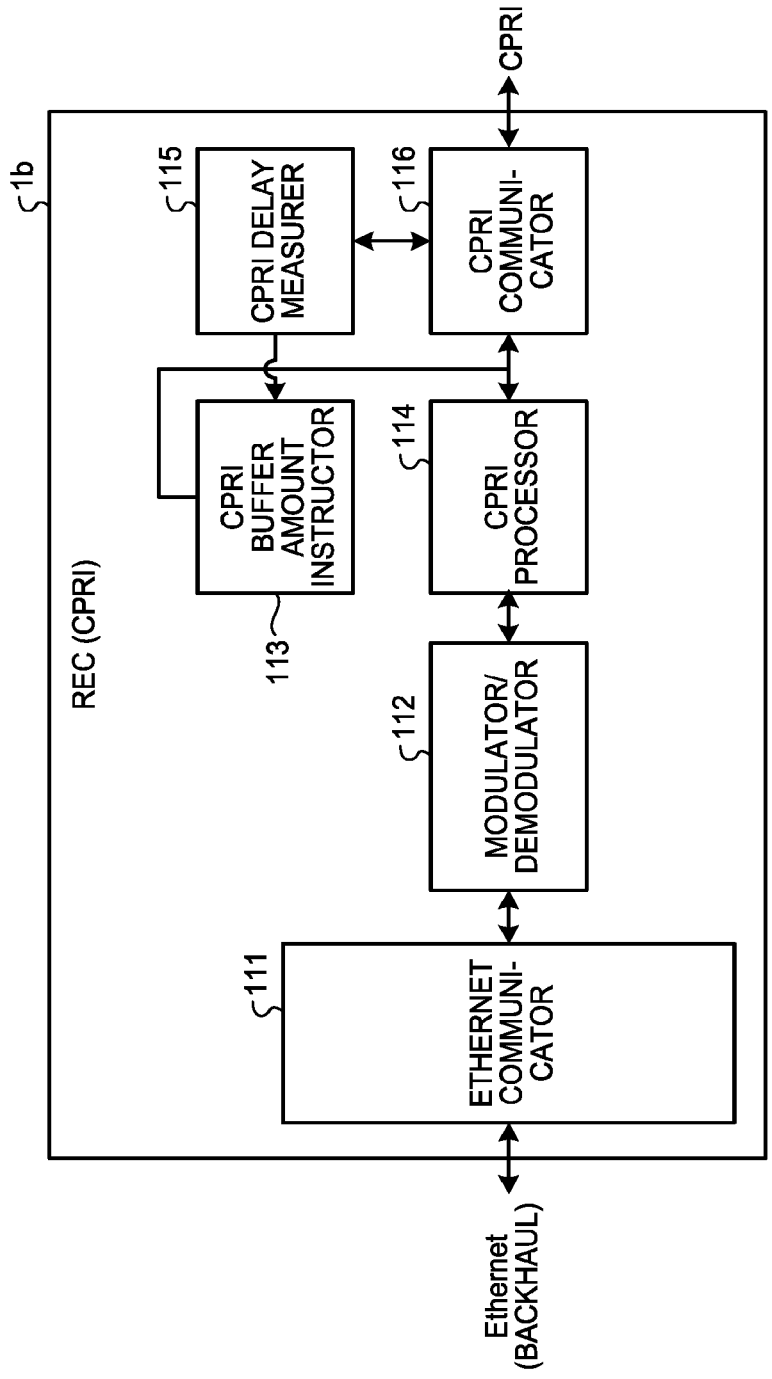
FIG. 10 is a block diagram of a functional configuration of an REC (CPRI) in the embodiment.

FIG. 10 is a block diagram of a functional configuration of the REC (CPRI) 1b in the embodiment. The REC (CPRI) 1b includes units 111 to 116.

The present embodiment performs communications by multiple-input and multiple-output (MIMO). The REC (CPRI) 1b determines the buffer amount of radio signal data in the RE 2 based on at least one of the timings when a plurality of flows of the radio signal data by MIMO reach an antenna and the delay time required for signal synthesis by MIMO. The following describes the processing in more detail.

Downstream Signal Processing

An Ethernet communicator 111 receives IP packets from the backhaul. A modulator/demodulator 112 converts the IP packets into radio IQ signals to be transmitted by the RE 2. A CPRI processor 114 converts the IQ signals into a frame of CPRI. A CPRI communicator 116 transmits the frame of CPRI.

Upstream Signal Processing

The CPRI communicator 116 receives a frame of CPRI. The CPRI processor 114 extracts IQ signals from the frame of CPRI. The modulator/demodulator 112 converts the IQ signals into IP packets. The Ethernet communicator 111 transmits the IP packets to the backhaul.

CPRI Buffer Amount Instruction Processing

A CPRI delay measurer 115 measures propagation delay by transmitting synchronization information on CPRI and receiving responses from the delay measurement responders of CPRI of the intermediate devices. The CPRI delay measurer 115 calculates the one-way delay of flows constituting the same MIMO, for example. The CPRI delay measurer 115 gives an instruction of the CPRI buffer amount (for example, the buffer amount of the CPRI transmission buffer 204 and the buffer amount of the CPRI reception buffer 205 of the RE (CPRI) 2a (FIG. 5)) in the transmission direction and the reception direction of the RE 2 corresponding to the link having the maximum delay. Buffering performed by the RE 2 may possibly affect delay measurement. For this reason, the buffer amount may be set considering how much buffer amount is set in advance in the transmission and reception directions by the CPRI buffer manager of the RE 2. Furthermore, the signal synthesis delay acquired from the signal synthesizer delay notifier 702 of the CPRI relay device 7 (FIG. 4) may be considered.

Figure 11:
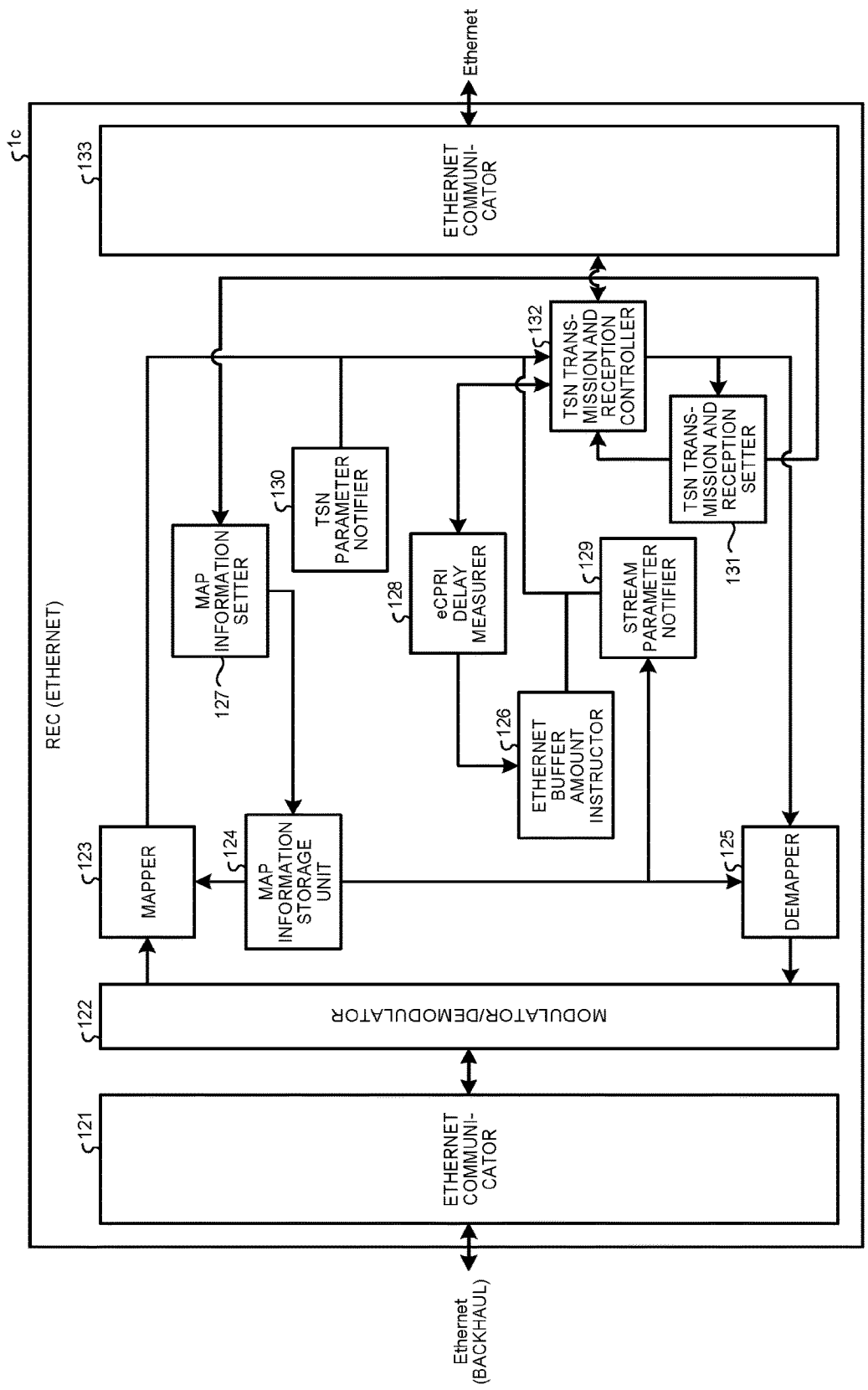
FIG. 11 is a block diagram of a functional configuration of an REC (Ethernet) in the embodiment.

FIG. 11 is a block diagram of a functional configuration of the REC (Ethernet) 1c in the embodiment. The REC (Ethernet) 1c includes units 121 to 133.

Ethernet Buffer Amount Instruction Processing

In the REC (Ethernet) 1c, an eCPRI delay measurer 128 measures the propagation delay to the RE 2. An Ethernet buffer amount instructor 126 calculates the one-way delay of flows constituting the same MIMO and gives an instruction of the Ethernet buffer amount in the transmission direction and the reception direction in the RE 2 corresponding to the link having the maximum delay. Buffering performed by the RE 2 may possibly affect delay measurement. For this reason, the buffer amount may be set considering how much buffer amount is set in advance in the transmission and reception directions in CPRI by the CPRI buffer manager of the RE 2 and how much buffer amount is set in the transmission and reception directions in Ethernet.

Figure 12:
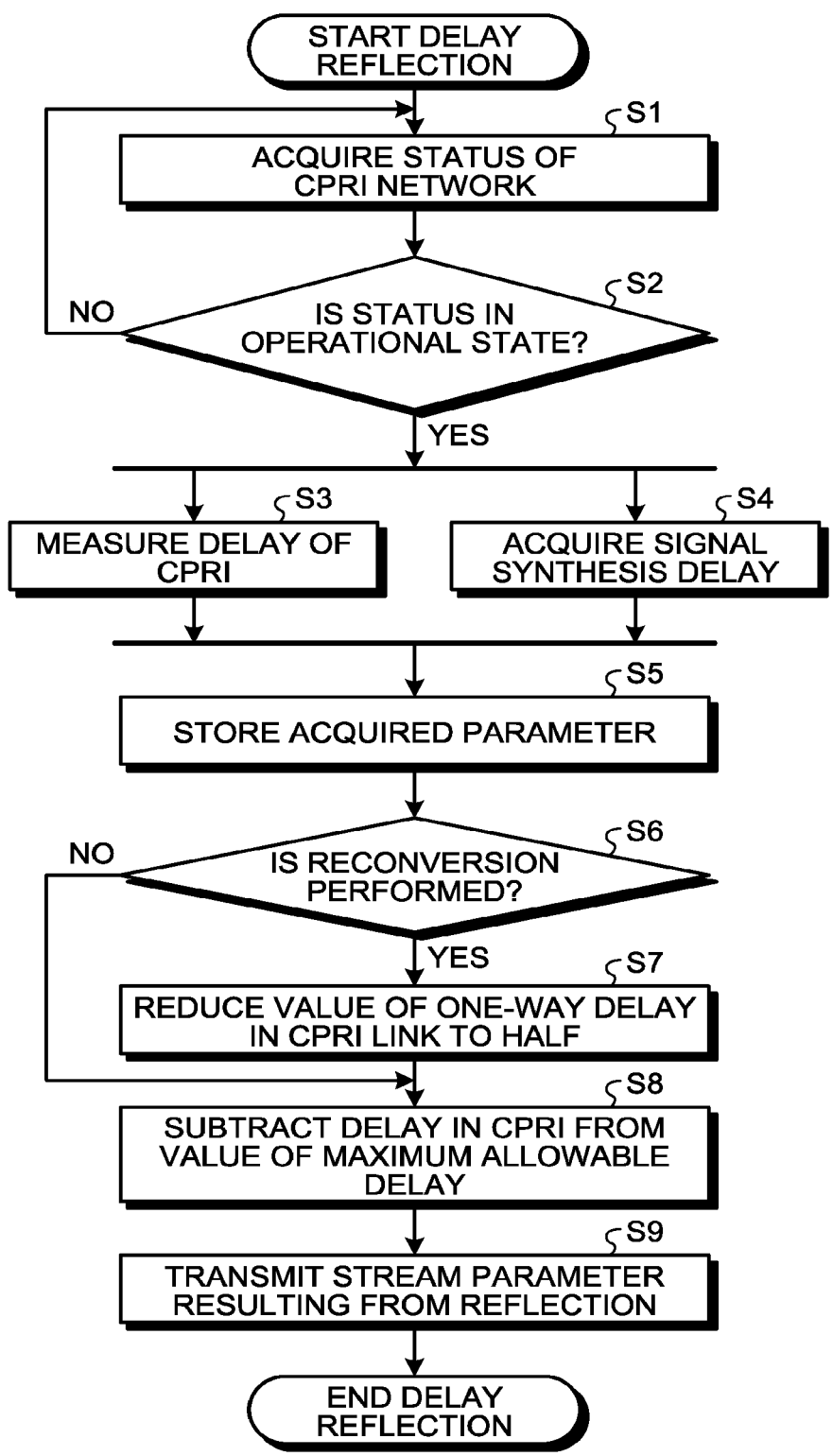
FIG. 12 is a flowchart of first delay reflection processing in the embodiment.

The following describes the processing performed by the devices with reference to FIGS. 12 to 18. FIG. 12 is a flowchart of first delay reflection processing in the embodiment. This processing is performed by, for example, the CPRI-Ethernet converting device 3 (FIG. 2).

At Step S1, the status acquirer 305 acquires the status of the CPRI network. Subsequently, at Step S2, the status acquirer 305 determines whether the CPRI link of a target port is in an operational state. When the determination result is Yes, the processing proceeds to Steps S3 and S4. When the determination result is No, the processing returns to Step S1.

At Step S3, the CPRI delay measurer 303 measures a delay of CPRI. At Step S4, the CPRI parameter acquirer 306 acquires a signal synthesis delay in the CPRI relay device 7. At Step S5, the CPRI parameter storage unit 307 stores the acquired parameter.

Subsequently, at Step S6, the reconversion determiner 308 performs the reconversion determination described above. When the determination result is Yes, the processing proceeds to Step S7. When the determination result is No, the processing proceeds to Step S8.

At Step S7, the parameter reflector 310 reduces, to half, the value of one-way delay in the CPRI link.

At Step S8, the parameter reflector 310 subtracts the delay in the CPRI link from the value of the maximum allowable delay.

Subsequently, at Step S9, the stream parameter notifier 314 transmits the delay parameter of the eCPRI network on which the delay parameter of the CPRI link is reflected to other devices.

Figure 13:
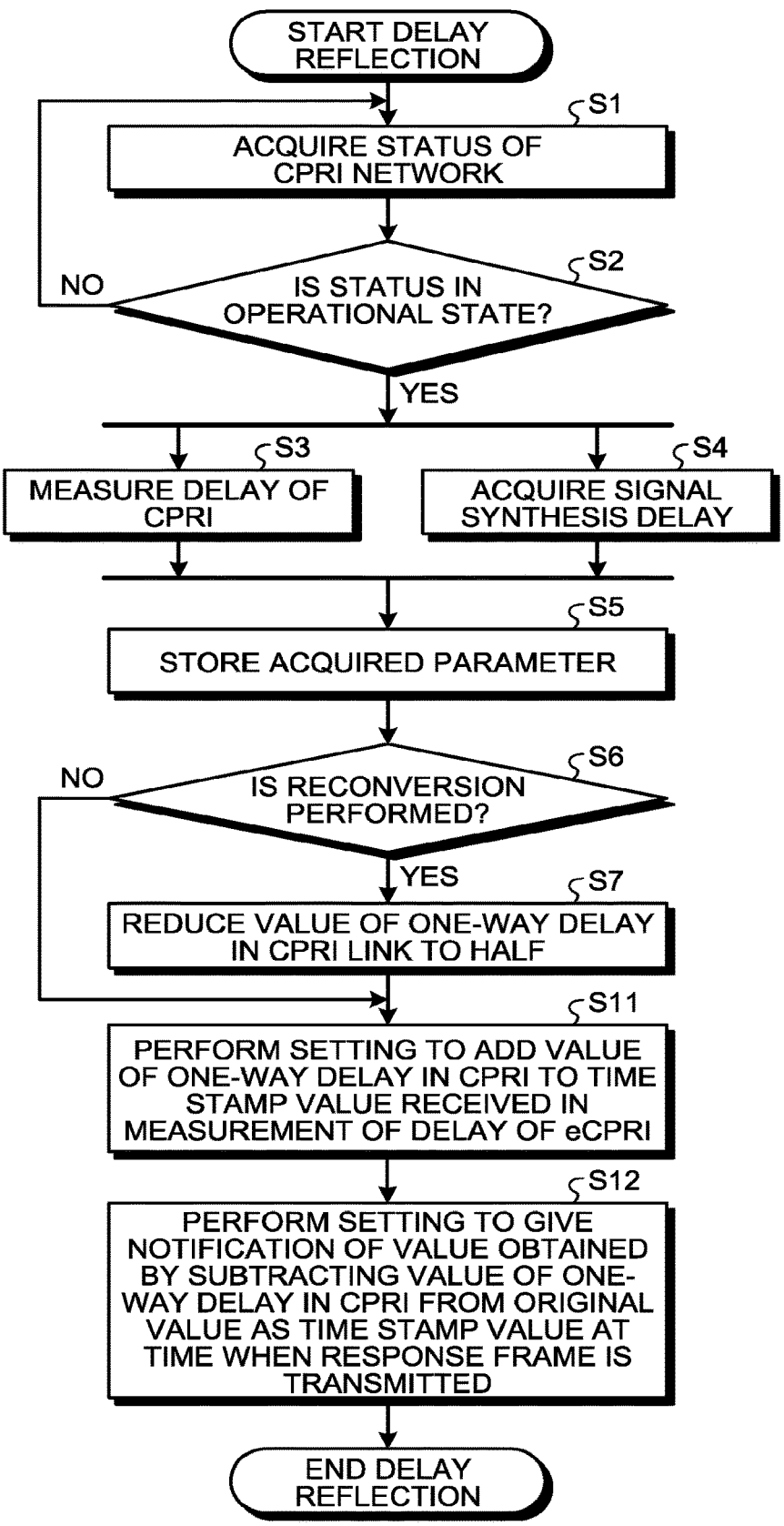
FIG. 13 is a flowchart of second delay reflection processing in the embodiment.

FIG. 13 is a flowchart of second delay reflection processing in the embodiment. This processing is performed by the CPRI-Ethernet converting device 3 (FIG. 2), for example. The processing performed at Steps S1 to S7 is the same as FIG. 12.

At Step S11 after Step S7, the parameter reflector 310 performs setting to add the value of one-way delay in CPRI to the time stamp value received in measurement of delay of eCPRI.

Subsequently, at Step S12, the parameter reflector 310 performs setting to give notification of a value obtained by subtracting the value of one-way delay in CPRI from the original value as the time stamp value at the time when a response frame is transmitted.

Figure 14:
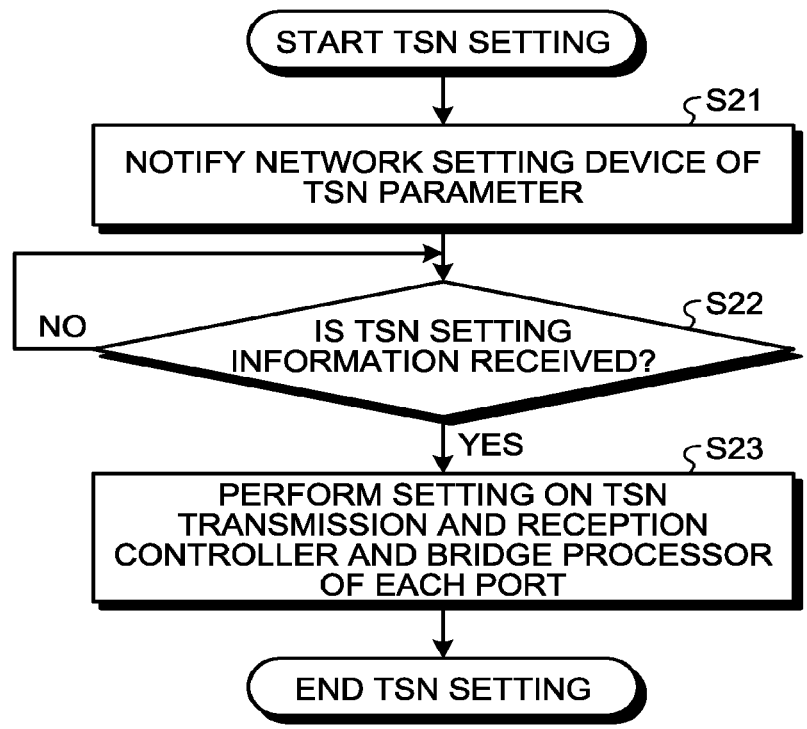
FIG. 14 is a flowchart of first time-sensitive networking (TSN) setting processing in the embodiment.

FIG. 14 is a flowchart of first TSN setting processing in the embodiment. This processing is performed by the Ethernet bridge device 5 (FIG. 7), for example.

At Step S21, the TSN parameter notifier 505 notifies the network setting device 6 of the TSN parameter.

Subsequently, at Step S22, the TSN setter 507 determines whether the TSN setting information is received from the network setting device 6. When the determination result is Yes, the processing proceeds to Step S23. When the determination result is No, the processing returns to Step S22.

At Step S23, the TSN setter 507 performs setting on the TSN transmission and reception controllers 508 and 509 and the bridge processor 506 of each port based on the TSN setting information.

Figure 15:
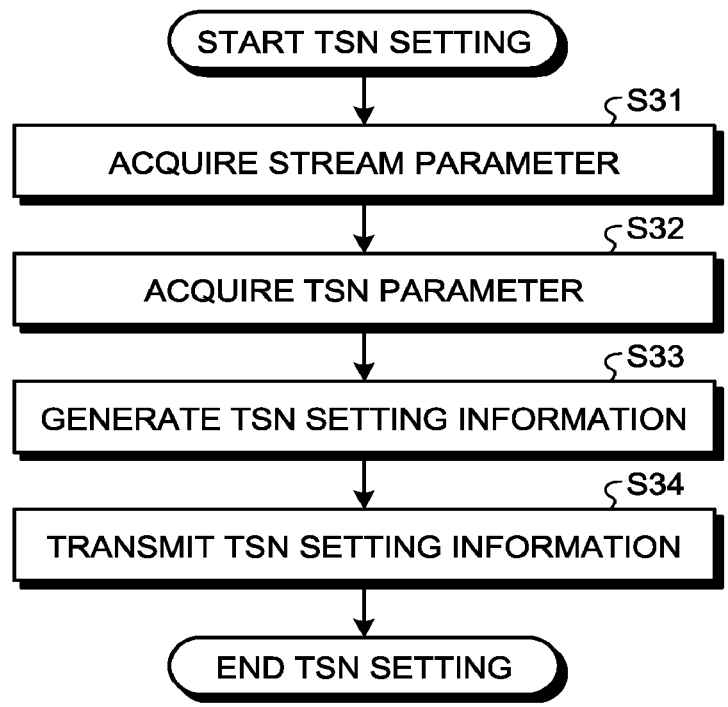
FIG. 15 is a flowchart of second TSN setting processing in the embodiment.

FIG. 15 is a flowchart of second TSN setting processing in the embodiment. This processing is performed by the network setting device 6 (FIG. 8), for example.

At Step S31, the stream parameter acquirer 602 acquires the stream parameter.

Subsequently, at Step S32, the TSN parameter acquirer 604 acquires the TSN parameter.

Subsequently, at Step S33, the TSN setting information generator 601 generates the TSN setting information based on the stream parameter and the TSN parameter.

Subsequently, at Step S34, the TSN setting information transmitter 603 transmits the TSN setting information to the CPRI-Ethernet converting device 3, the RE (Ethernet) 2b, and the Ethernet bridge device 5. These devices perform setting on the TSN transmission and reception controllers for each Ethernet port.

Figure 16:
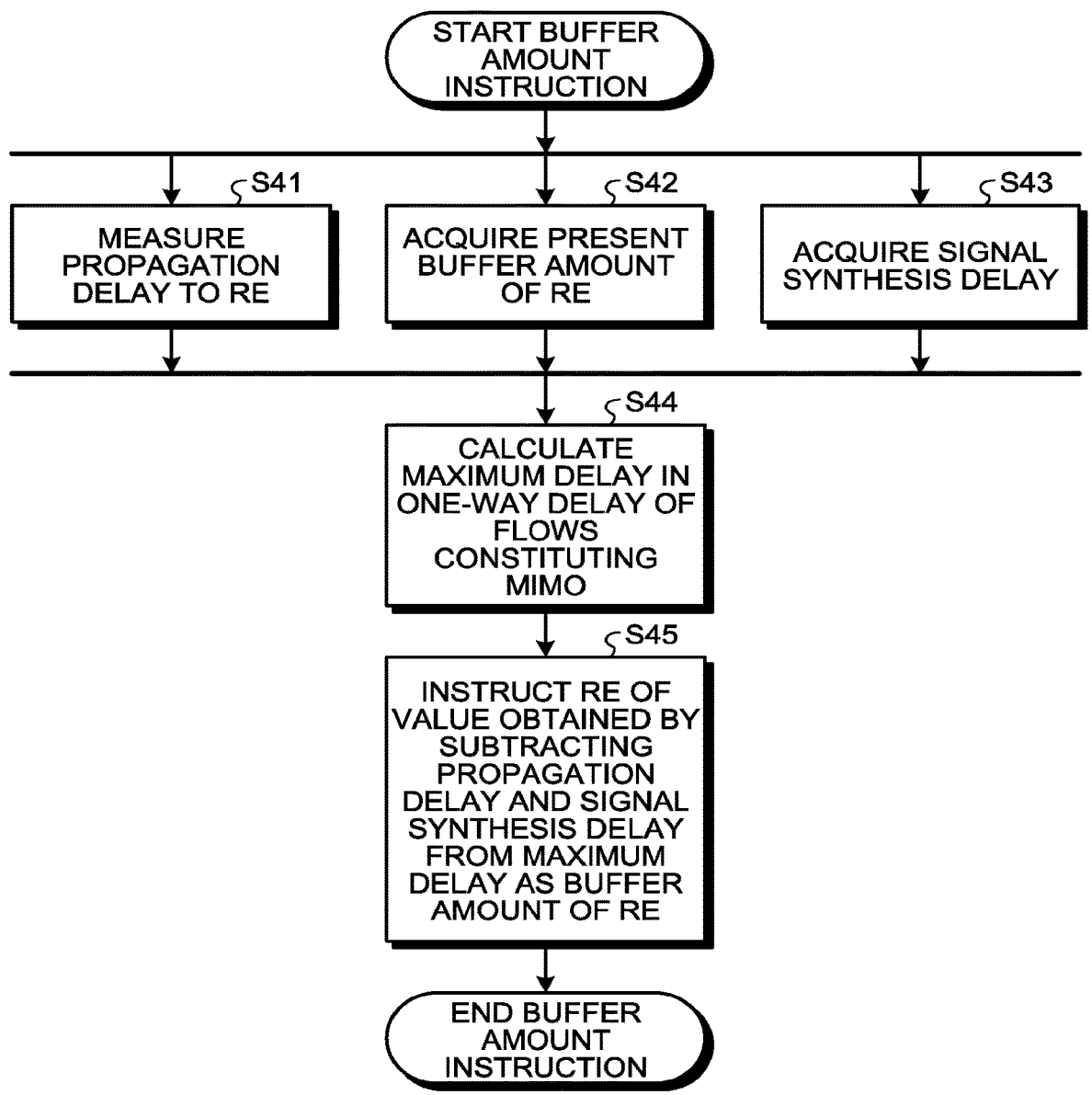
FIG. 16 is a flowchart of buffer amount instruction processing in the embodiment.

FIG. 16 is a flowchart of buffer amount instruction processing in the embodiment. This processing is performed by the REC (CPRI) 1b (FIG. 10), for example.

At Step S41, the CPRI delay measurer 115 measures the propagation delay to the RE 2.

At Step S42, the CPRI buffer amount instructor 113 acquires the present buffer amount of the RE 2.

At Step S43, the CPRI buffer amount instructor 113 acquires the signal synthesis delay in the CPRI relay device 7.

Subsequently, at Step S44, the CPRI delay measurer 115 calculates the maximum delay in the one-way delay of flows constituting the same MIMO.

Subsequently, at Step S45, the CPRI buffer amount instructor 113 instructs the RE 2 of a value obtained by subtracting the propagation delay and the signal synthesis delay from the maximum delay as the buffer amount of the RE 2.

Figure 17:
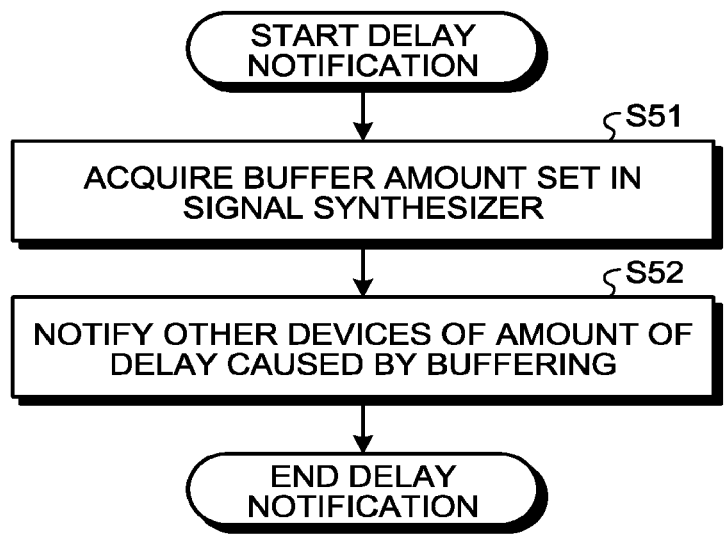
FIG. 17 is a flowchart of delay notification processing in the embodiment.

FIG. 17 is a flowchart of delay notification processing in the embodiment. This processing is performed by the CPRI relay device 7 (FIG. 4), for example.

At Step S51, the signal synthesizer delay notifier 702 acquires the buffer amount set in the signal synthesizer 705.

Subsequently, at Step S52, the signal synthesizer delay notifier 702 notifies other devices of the amount of delay caused by buffering.

Figure 18:
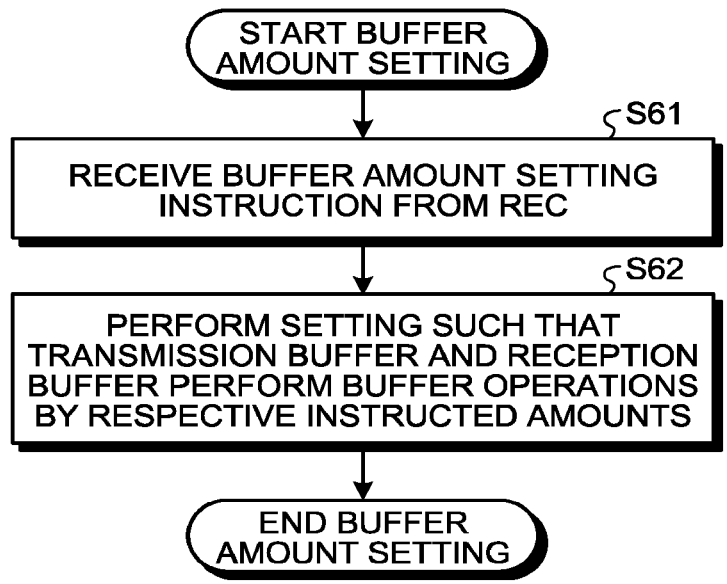
FIG. 18 is a flowchart of buffer amount setting processing in the embodiment.

FIG. 18 is a flowchart of buffer amount setting processing in the embodiment. This processing is perfoiined by the RE (CPRI) 2a (FIG. 5), for example.

At Step S61, the CPRI buffer amount manager 203 receives a buffer amount setting instruction from the REC (CPRI) 1b.

Subsequently, at Step S62, based on the buffer amount setting instruction, the CPRI buffer amount manager 203 performs setting such that the CPRI transmission buffer 204 and the CPRI reception buffer 205 perform buffering with the respective instructed amounts.

As described above, in the communication relay system S according to the present embodiment, the CPRI-Ethernet converting device 3 acquires the delay parameter of the first network (CPRI network) and reflects it on the delay parameter of the second network (eCPRI network) (which will be simply referred to as "reflection"). Consequently, the communication relay system S is able to transmit radio signal data while satisfying required conditions on delay when the radio signal data is transmitted via networks using different communication methods.

Specifically, the communication relay system S is able to perform reflection using the map information described above, for example.

Specifically, the reflection can be performed by adding or subtracting the delay parameter based on, for example, the maximum allowable delay time and the time stamp value. The communication relay systems are able to perform reflection by subtracting a one-way delay time in the CPRI network from the entire maximum allowable delay time relating to the flow and generating the maximum allowable delay time of the eCPRI network, for example.

The parameter notifiers of the respective devices is able to notify other devices of the delay parameter resulting from reflection.

A trigger for performing reflection may be the timing when the status of the CPRI network is turned into an operational state, for example.

When the reconversion described above is performed, the communication relay system S is able to perform accurate reflection by reflecting half of the one-way delay time in the CPRI network on the delay parameter of the eCPRI network.

The above-described reflection processing is also applied to TSN setting that is performed based on the TSN setting information.

When the communications are performed by MIMO, the communication relay system S is able to perform the communications by MIMO without any trouble by determining the buffer amount based on at least one of the timings when a plurality of flows of the radio signal data by MIMO reach an antenna and the delay time required for signal synthesis by MIMO.

The computer program executed by the devices in the communication relay system S according to the present embodiment can be recorded and provided in a computer-readable recording medium, such as a compact disc read only memory (CD-ROM), a flexible disk (FD), a compact disc recordable (CD-R), and a digital versatile disc (DVD), as an installable or executable file.

The computer program executed by the devices in the communication relay system S according to the present embodiment may be stored in a computer that is capable of communicating with other communication investment over a network, such as the Internet, and provided by being downloaded over the network. Furthermore, the computer program according to the present embodiment may be provided or distributed over a network, such as the Internet. The computer program according to the present embodiment may be embedded and provided in a ROM, for example.

While certain embodiments have been described, these embodiments have been presented by way of example only, and are not intended to limit the scope of the invention. Indeed, the novel devices and system described herein may be embodied in a variety of other forms; furthermore, various omissions, substitutions and changes in the form of the devices and system described herein may be made without departing from the spirit of the invention. The accompanying claims and their equivalents are intended to cover such forms or modifications as would fall within the scope and spirit of the invention.

While the embodiment above describes the CPRI network as an example of the first network and the eCPRI network as an example of the second network, the embodiment is not limited thereto. By contrast, the eCPRI network may be an example of the first network, and the CPRI network may be an example of the second network, for example.

The present invention is also applicable to transferring radio signal data not by CPRI but by open base station architecture initiative (OBSAI) R3-01.

The network setting device 6 may be integrated with the Ethernet bridge device 5. In other words, the network setting device 6 may be implemented as a device that operates as a fully distributed model described in IEEE 802.1Qcc standard.

What is claimed is:

1. A communication device capable of communicating with another communication device via a first network and a second network each transmitting radio signal data by different communication methods, the communication device comprising:
 a first communicator capable of communicating with another communication device via the first network;
 a second communicator capable of communicating with another communication device via the second network;
 a delay parameter acquirer to acquire a delay parameter of the first network; and
 a delay parameter reflector to reflect the delay parameter of the first network acquired by the delay parameter acquirer on a delay parameter of the second network, wherein the delay parameter reflector reflects the delay parameter of the first network on the delay parameter of the second network by using map information that relates to the radio signal data, the map information includes a map information ID for identifying the map information and a type indicating whether to perform mapping or demapping, and delay parameters of the first network and the second network for each link through which the radio signal data passes, the delay parameters indicating a maximum allowable delay time of a stream of a radio signal data.

2. The communication device according to claim 1, wherein the delay parameter reflector generates the delay parameter of the second network by at least one of adding and subtracting the delay parameter of the first network to and from a predetermined delay parameter.

3. The communication device according to claim 1, further comprising a parameter notifier to notify another device of the delay parameter of the second network, on which the delay parameter of the first network has been reflected by the delay parameter reflector.

4. The communication device according to claim 2, wherein
the predetermined delay parameter is a maximum allowable delay time of a stream of the radio signal data, and
the delay parameter reflector generates a maximum allowable delay time of the second network by subtracting a one-way delay time in the first network from the maximum allowable delay time of a stream of the radio signal data.

5. The communication device according to claim 1, further comprising a delay measurer to execute delay measurement of the second network,
wherein, when delay measurement is requested by another device, the delay measurer adds the delay parameter of the first network to a time stamp value and gives a response to the request for delay measurement.

6. The communication device according to claim 1, further comprising a status acquirer to acquire a status of the first network,
wherein, when the status acquired by the status acquirer is in an operational state, the delay parameter acquirer acquires the delay parameter of the first network.

7. The communication device according to claim 1, further comprising a reconversion determiner to determine whether or not to perform communication at the first network side via the first communicator by the same communication method as the second network,
wherein, when the reconversion determiner determines that communication at the first network side is performed by the same communication method as the second network, the delay parameter reflector reflects half of a one-way delay time in the first network on the delay parameter of the second network when reflecting the delay parameter of the first network on the delay parameter of the second network.

8. The communication device according to claim 1, wherein
the first network is a network using common public radio interface (CPRI), and
the second network is a network using eCPRI.

* * * * *